(12) United States Patent
Nakazawa et al.

(10) Patent No.: US 8,716,935 B2
(45) Date of Patent: May 6, 2014

(54) LIGHT IRRADIATION CONTROL SYSTEM FOR VEHICLE LAMP

(75) Inventors: Yuichi Nakazawa, Shizuoka (JP); Toshihiko Kurebayashi, Shizuoka (JP); Tomoyuki Sakai, Shizuoka (JP); Katsumi Inoue, Shizuoka (JP); Hiroshi Otaka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 345 days.

(21) Appl. No.: 12/961,666

(22) Filed: Dec. 7, 2010

(65) Prior Publication Data

US 2011/0133646 A1   Jun. 9, 2011

(30) Foreign Application Priority Data

Dec. 8, 2009 (JP) ................................. 2009-278440

(51) Int. Cl.
*B60Q 1/02* (2006.01)

(52) U.S. Cl.
USPC .................. 315/82; 315/80; 315/83; 315/159; 307/10.8

(58) Field of Classification Search
USPC ........ 315/77, 82, 83, 159; 362/276, 466, 459, 362/802, 465; 701/49; 307/10.8
See application file for complete search history.

(56) References Cited

U.S. PATENT DOCUMENTS

| | | | | |
|---|---|---|---|---|
| 5,841,203 A | * | 11/1998 | Chambers et al. | 307/10.8 |
| 6,305,823 B1 | * | 10/2001 | Toda et al. | 362/276 |
| 6,821,005 B2 | * | 11/2004 | Uchida et al. | 362/466 |
| 7,054,730 B2 | * | 5/2006 | Izawa et al. | 701/49 |
| 7,241,034 B2 | * | 7/2007 | Smith et al. | 362/465 |
| 7,552,001 B2 | * | 6/2009 | Ando | 701/49 |
| 7,572,040 B2 | * | 8/2009 | Okura et al. | 362/465 |
| 7,649,321 B2 | * | 1/2010 | Nakazawa et al. | 315/82 |
| 8,010,259 B2 | * | 8/2011 | Nakazawa et al. | 701/49 |

(Continued)

FOREIGN PATENT DOCUMENTS

| CN | 1502501 A | 6/2004 |
|---|---|---|
| CN | 201002553 Y | 1/2008 |

(Continued)

OTHER PUBLICATIONS

State Intellectual property Office of the People's Republic of China, Communication in Patent Application No. 201010588213.2, dated Aug. 31, 2012 (with English-language translation).

(Continued)

*Primary Examiner* — Daniel Cavallari
*Assistant Examiner* — Srinivas Sathiraju
(74) *Attorney, Agent, or Firm* — Fish & Richardson P.C.

(57) ABSTRACT

A light irradiation control system for a vehicle lamp includes a control unit configured to provide control signals for controlling light irradiation of the vehicle lamp based on detection signals detected by sensors. Actuator units are configured to control the light irradiation of the vehicle lamp based on the control signals. The control unit includes a body-side control unit and a lamp-side control unit. The body-side control unit is configured to perform signal processing on the detection signals and to provide the signal-processed signals to a common bus as common data. The lamp-side control unit, which is mounted in at least some of the actuator units, is connected to the common bus to provide the control signals based on the common data provided to the common bus.

14 Claims, 6 Drawing Sheets

(56) References Cited

U.S. PATENT DOCUMENTS

| | | | |
|---|---|---|---|
| 2003/0090905 A1* | 5/2003 | Uchida et al. | 362/465 |
| 2004/0022063 A1* | 2/2004 | Le Bars et al. | 362/465 |
| 2005/0192726 A1* | 9/2005 | Okura et al. | 701/36 |
| 2006/0291230 A1 | 12/2006 | Tajima et al. | |

FOREIGN PATENT DOCUMENTS

| | | |
|---|---|---|
| DE | 199 05 173 | 8/2000 |
| DE | 199 08 482 | 9/2000 |
| DE | 10 2005 040 980 | 3/2007 |
| EP | 1 298 009 | 4/2003 |
| JP | 2000-118293 | 4/2000 |
| JP | 2003-191788 | 7/2003 |
| JP | 2005-186731 | 7/2005 |
| JP | 2006-56436 A | 3/2006 |
| JP | 2007-1428 | 1/2007 |
| JP | 2008-30363 | 2/2008 |
| JP | 2008-260534 | 10/2008 |
| JP | 2009-190490 | 8/2009 |
| KR | 10-2004-0025830 | 3/2004 |
| KR | 10-2006-012866 A1 | 12/2006 |

OTHER PUBLICATIONS

Korean Patent Office, Office Action in Patent Application No. 10-2010-0123527 (dated Jun. 13, 2012).

European Search Report for Application No. 10194204.3 dated Mar. 28, 2011.

Korean Patent Office, Office Action in Patent Application No. 10-2010-0123527 (dated Jun. 27, 2013).

Japanese Patent Office, official communication in patent appln. No. 2009-278440, dated Oct. 22, 2013. (with English translation).

* cited by examiner

LIGHT IRRADIATION CONTROL SYSTEM FOR VEHICLE LAMP

CROSS-REFERENCE TO RELATED APPLICATION

This application claims priority from Japanese Patent Application No. 2009-278440, filed on Dec. 8, 2009, the entire contents of which are incorporated herein by reference.

BACKGROUND

1. Technical Field

The present disclosure relates to a control system for controlling a light irradiation direction or a light irradiation range of a lamp installed in a vehicle such as an automobile. More particularly, the present disclosure relates to a light irradiation control system for a vehicle lamp, which can achieve a simpler configuration of a control unit or an actuator constituting the system.

2. Related Art

Figure 6:
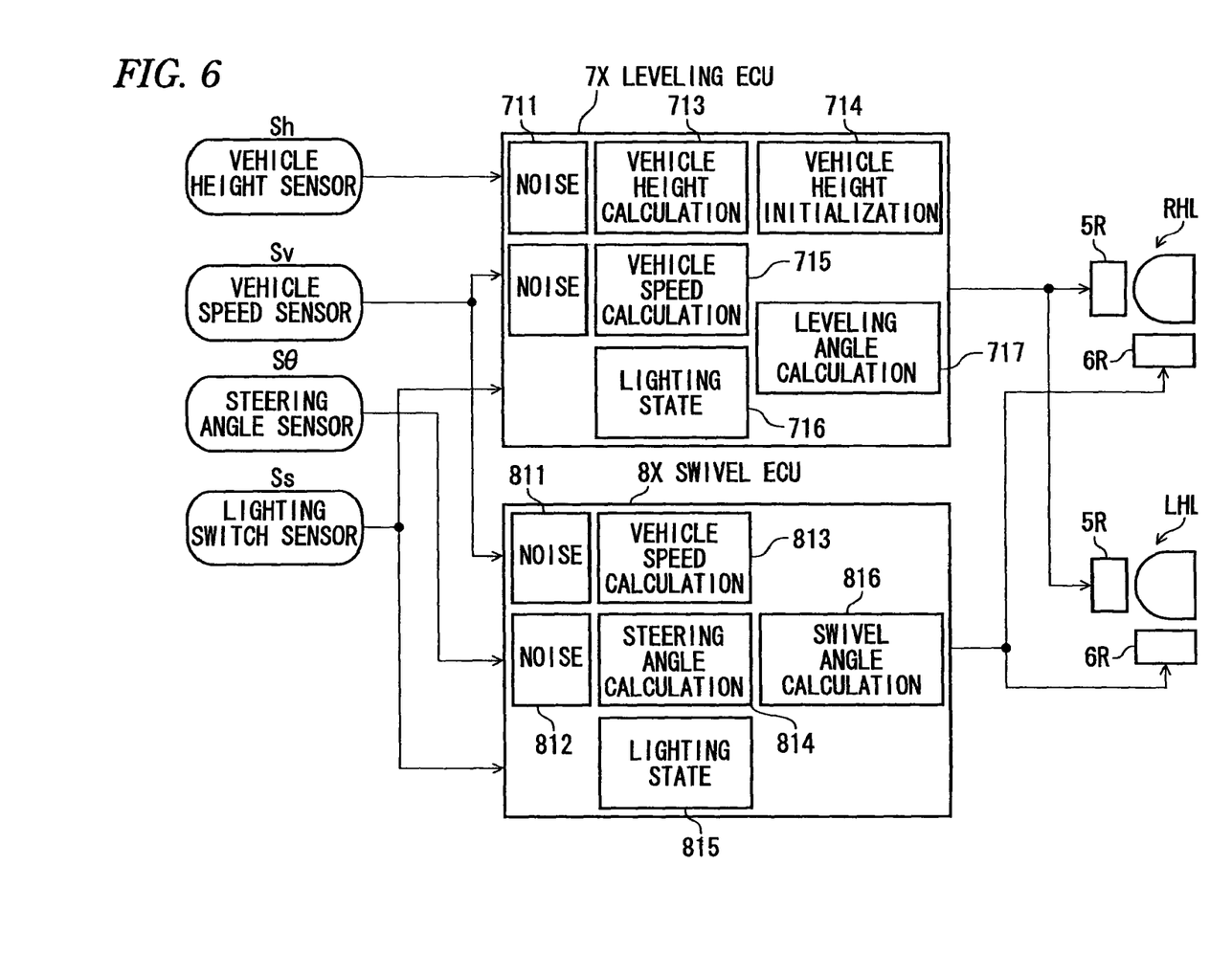
FIG. 6 is a block diagram illustrating the configuration of an optical irradiation control system in the related art.

In the related art, various systems are known for controlling an optical axis direction of a lamp as one of the optical irradiation characteristics of a vehicle headlamp. Such systems include a leveling control system for constantly maintaining the irradiation angle with respect to the road surface by deflection-controlling the lamp optical axis in the upward and downward vertical directions in accordance with the changes in the pitch angle of the automobile or a swivel control system for irradiating a steering destination by deflection-controlling the lamp optical axis in the left and right horizontal directions in accordance with the changes in the steering angle of the automobile. For example, Japanese patent document JP-A-2000-118293 describes an apparatus for performing auto leveling control. This kind of auto leveling apparatus, as illustrated in FIG. 6, includes a vehicle height sensor Sh that detects changes in the front and rear vehicle height of the automobile in order to obtain the pitch angle of the automobile, a vehicle speed sensor Sv that detects the vehicle speed to determine whether to perform the leveling control in accordance with the vehicle speed change of the automobile, and a lighting switch sensor Ss that detects the lighting state of a headlamp at the leveling control timing. Also, in such an auto leveling apparatus, the respective detection outputs of these sensors are provided to a leveling ECU (Electronic Control Unit) 7X. The leveling ECU 7X performs predetermined calculations based on these detection outputs, and generates and provides a control signal for controlling the lamp optical axis of left and right headlamps RHL and LHL at a suitable leveling angle. Also, in these left and right headlamps RHL and LHL, leveling actuators (ACTs) 5R and 5L for vertically deflecting the lamp optical axis are installed to perform, respectively, leveling control of the lamp optical axis of the left and right headlamps RHL and LHL through drive control of the left and right leveling ACTs 5R and 5L by means of the control signal from the leveling ECU 7X.

In order to generate the leveling control signal, the leveling ECU 7X is provided with noise removal units 711 and 712 for removing noise included in the detection outputs from the respective sensors, a vehicle height calculation unit 713 that obtains a vehicle height value by performing a predetermined calculation based on the detection output of the vehicle height sensor, a vehicle height initialization unit 714 that corrects an assembly error when the vehicle height sensor Sh is assembled in an automobile, a vehicle speed calculation unit 715 that obtains a vehicle speed value by performing a predetermined calculation based on the detection output from the vehicle speed sensor Sv, and a lighting state determination unit 716 that determines the light state from the output of the lighting switch Ss. Further, the leveling ECU 7X is provided with a leveling angle calculation unit 717 that calculates the proper leveling angle based on the determination of the vehicle height value initialized by the vehicle height initialization unit 714, the vehicle speed value, and the lighting state, and provides a leveling angle as the leveling control signal.

If an automobile provided with the foregoing leveling control system also is provided with the swivel control system, the vehicle height sensor Sh, the vehicle speed sensor Sv, and the lighting switch sensor Ss can be used commonly in the respective systems, but a swivel ECU for generating a swivel control signal needs to be provided independently of the leveling ECU. As illustrated in FIG. 6, in order to generate the swivel control signal based on the detection outputs from the vehicle speed sensor Sv, a steering angle sensor S$\theta$ and the lighting switch sensor Ss, the swivel ECU 8X is provided with noise removal units 811 and 812 for performing a noise removal process on respective outputs of the vehicle speed sensor Sv and the steering angle sensor S$\theta$. The ECU 8X also is provided with a vehicle speed calculation unit 813, a steering angle calculation unit 814, and a lighting state determination unit 815 which perform, respectively, the vehicle speed calculation, steering angle calculation, and lighting state determination in accordance with the outputs of the vehicle speed sensor Sv, the steering angle sensor S$\theta$, and the lighting switch sensor Ss. The swivel ECU 8X is also provided with a swivel angle calculation unit 816 to calculate the swivel angle based on the outputs. The swivel ECU 8X may perform the same process as the leveling ECU 7X. Thus, in this case, the noise removal units 711 and 811, the vehicle speed calculation units 715 and 813, and the lighting state determination units 716 and 815 are equivalent to each other, respectively. Since the leveling ECU and the swivel ECU are provided with the same units as described above, the corresponding constituent units are present in duplicate when the leveling ECU and the swivel ECU are combined together, especially in automobiles provided with both the leveling control system and the swivel control system. This situation can lead to an increase in the system size and cost. Also, when the respective ECUs operate simultaneously, the respective constituent units perform the same calculation of the operation values or the same state determination, and thus unnecessary power consumption occurs.

SUMMARY

Some embodiments described in the present disclosure address the foregoing problems as well as other problems not specifically described above. However, some embodiments may not overcome these problems.

According to some implementations, a light irradiation control system for a vehicle lamp can reduce the system size by providing components and circuits as the control system.

According to one aspect, a light irradiation control system for a vehicle lamp includes a control unit configured to provide control signals for controlling light irradiation of the vehicle lamp based on detection signals detected by sensors. Actuator units are configured to control the light irradiation of the vehicle lamp based on the control signals. The control unit includes a body-side control unit and a lamp-side control unit. The body-side control unit is configured to perform signal processing on the detection signals and to provide the signal-processed signals to a common bus as common data. The lamp-side control unit, which is mounted in at least some of the actuator units, is connected to the common bus to provide the control signals based on the common data provided to the common bus.

Some implementations include one or more of the following features. For example, the actuator units can be connected to the common bus. The lamp-side control unit can be mounted in some of the actuator units, and other ones of the actuator units control the light irradiation of the vehicle lamp based on control signals from the lamp-side control unit mounted in the actuator units.

In some implementations, each of the actuator units includes a main structural portion configured according to a standard, and a sub structural portion having the same standard as the main structural portion. The lamp-side control unit can be mounted on the sub-structural unit.

In some implementations, the lamp-side control unit includes an abnormality detection unit configured to detect abnormalities of the actuator units to provide abnormality detection signals. The lamp-side control unit can be configured to provide the abnormality detection signals to the common bus as data.

In addition, in some implementations, the lamp-side control unit includes an operational position detection unit configured to detect operational positions of the actuator units to provide operational position detection signals. The lamp-side control unit can be configured to provide the operational position detection signals to the common bus as data.

Further, according to some implementations, the actuator units are configured to control an optical axis direction of the vehicle lamp.

Other aspects, features and advantages of the present invention will be apparent from the following description, the drawings and the claims.

DETAILED DESCRIPTION OF EXEMPLARY EMBODIMENTS

Figure 1:
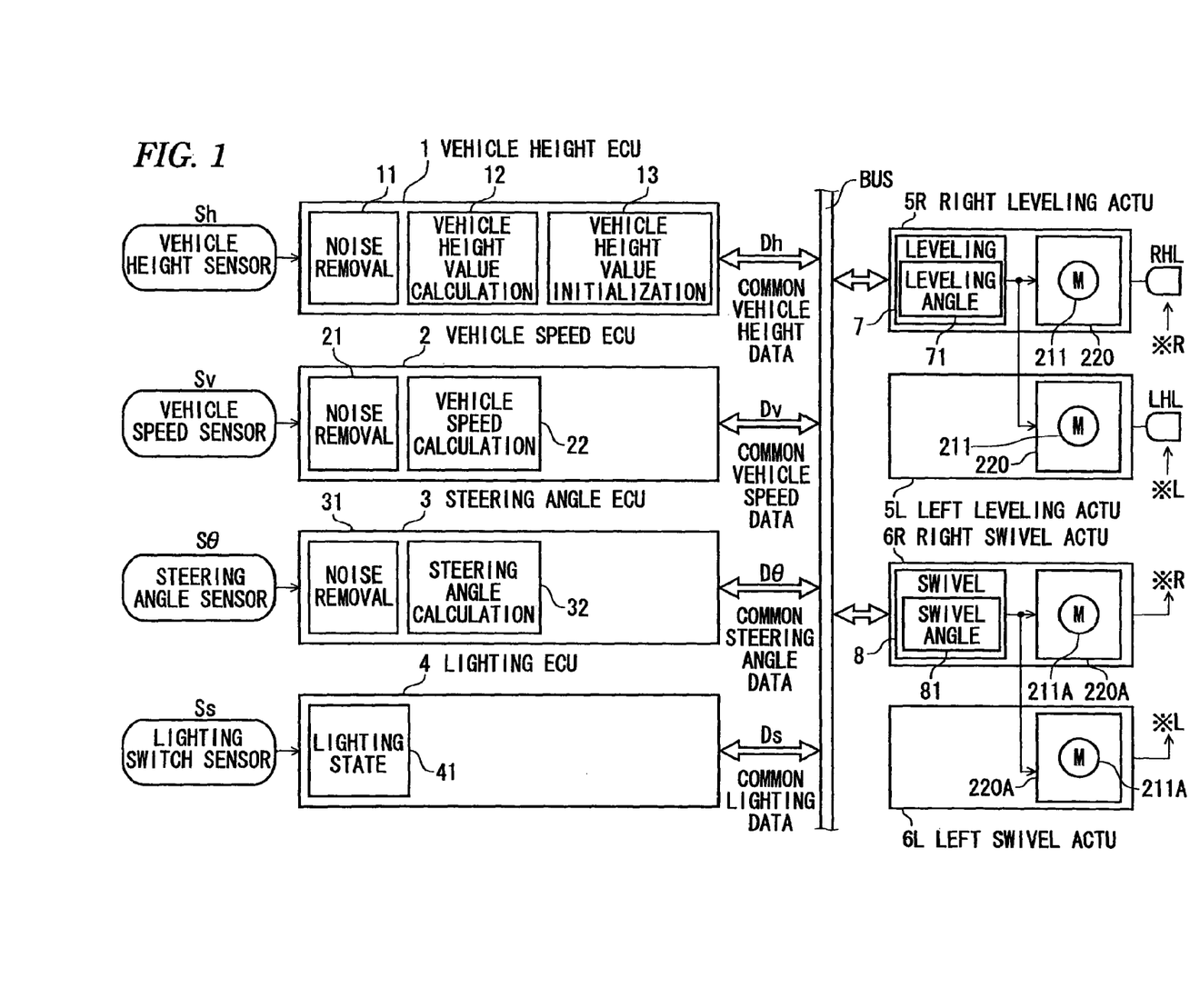
FIG. 1 is a block diagram illustrating an example configuration of an optical irradiation control system according to an embodiment of the present invention.

FIG. 1 is a block diagram illustrating a control system for controlling an optical irradiation direction of a vehicle headlamp, i.e. a lamp optical axis direction. The control system is provided with a vehicle height sensor Sh that detects the height of a rear wheel of the vehicle, a vehicle speed sensor Sv that detects the speed of the vehicle, a steering angle sensor Sθ that detects the steering angle of the vehicle, and a lighting switch sensor Ss of a lighting signal of the headlamp. In the illustrated example, these sensors are connected to a body-side control unit. That is, the vehicle height sensor Sh, the vehicle speed sensor Sv, the steering angle sensor Sθ, and the lighting switch sensor Ss are connected to a vehicle height ECU 1, a vehicle speed ECU 2, a steering angle ECU 3, and a lighting ECU 4, respectively. The vehicle height ECU 1, the vehicle speed ECU 2, the steering angle ECU 3, and the lighting ECU 4 constitute the body-side control unit. The respective ECUs are connected to a common bus BUS through which respective data is accessible.

The vehicle height sensor Sh detects the height of the rear wheel of the vehicle as a voltage signal that changes in accordance with a change in the height of the rear wheel. The vehicle height ECU 1 is provided with a noise removal unit 11 that receives an input of the voltage signal and removes noise included in the voltage signal. The vehicle height ECU 1 is provided with a vehicle height calculation unit 12 to calculate a vehicle height value by performing a predetermined calculation based on the noise-removed voltage signal. Also, the vehicle height ECU 1 is provided with a vehicle height initialization unit 13 that corrects the vehicle height value calculated by a vehicle height calculation unit 12 based on an assembling error for each vehicle. This allows correction of the assembling error when different vehicle height sensors are assembled for respective vehicles. The vehicle height ECU 1 performs the calculation and initialization of the vehicle height value, prepares common vehicle height data Dh by a standard in the system based on the initialized vehicle height value, and then provides the common vehicle height data Dh to the common bus BUS.

The vehicle speed sensor Sv provides a vehicle speed pulse signal corresponding to the vehicle speed of the vehicle. The vehicle speed ECU 2 is provided with a noise removal unit 21 that receives the vehicle speed pulse signal and removes noise included in the vehicle speed pulse signal. The vehicle speed ECU 2 also is provided with a vehicle speed value calculation unit 22 that calculates a vehicle speed value by performing a predetermined calculation based on the noise-removed vehicle speed pulse signal. The vehicle speed ECU 2 prepares common vehicle speed data Dv by a standard based on the vehicle speed value, and provides the common vehicle speed data Dv to the common bus BUS.

The steering angle sensor Sθ provides a steering angle pulse signal corresponding to the steering rotation angle of the steering wheel of the vehicle. The steering angle ECU 3 is provided with a noise removal unit 31 that receives the steering angle pulse signal and removes noise included in the steering angle pulse signal. The steering angle ECU 3 also is provided with a steering angle calculation unit 32 that calculates a steering angle by performing a predetermined calculation based on the noise-removed steering angle pulse signal. The steering angle ECU 3 prepares common steering angle data Dθ by a standard based on the steering angle, and provides the common steering angle data Dθ to the common bus.

The lighting switch is a switch that lights up the headlamp when it is shifted to an ON state, for example, by a driver, and the lighting switch sensor Ss detects an ON/OFF signal of the lighting switch. The lighting ECU 4 is provided with a lighting switch determination unit 41 and generates the ON signal when the lighting switch is manipulated and the OFF signal when the lighting switch is not manipulated as common lighting data Ds by a standard, and provides the common lighting data Ds to the common bus BUS.

A right headlamp RHL and a left headlamp LHL are provided, respectively, on the right and left sides of a front portion of a vehicle body. Installed on the right and left headlamps are leveling ACTUs (Actuator Units) 5R and 5L, which can deflect the lamp optical axis of the lamp unit that emits lamp light in the vertical upward and downward directions. Also installed on the headlamps are swivel ACTUs 6R and 6L, which can deflect the lamp optical axis in the horizontal left and right directions. As described in greater detail below a leveling ECU 7 is integrally configured with the leveling ACTU 5R, and a swivel ECU 7 is integrally configured with the swivel ACTU 6R. The leveling ECUs 5R and 5L and the swivel ECUs 6R and 6L constitute the lamp-side control unit according.

Figure 2:
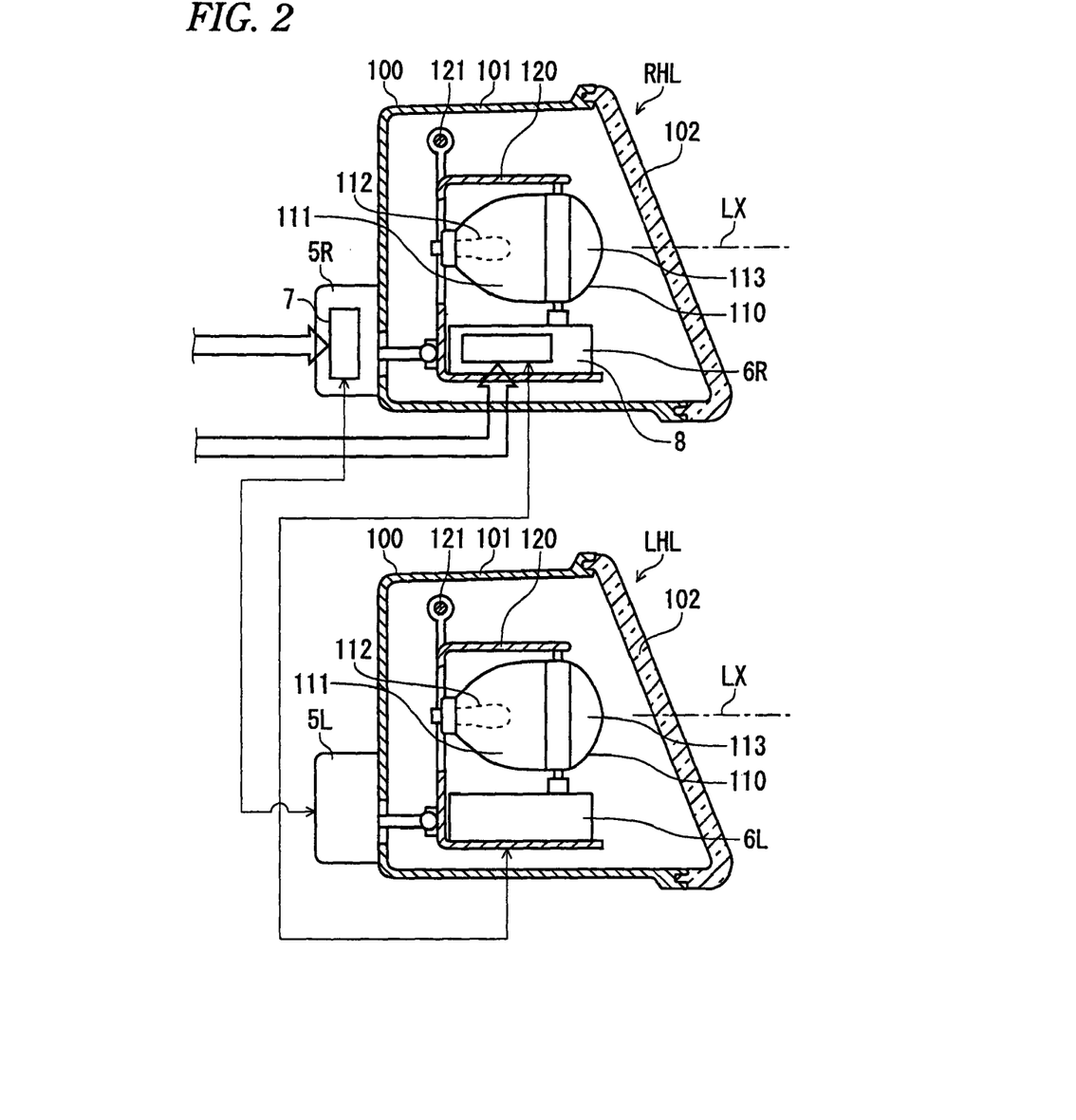
FIG. 2 is a schematic view illustrating the structure of headlamps.

The leveling ACTUs 5R and 5L and the swivel ACTUs 6R and 6L are installed on the right and left headlamps RHL and LHL, respectively. FIG. 2 is a schematic view illustrating left and right headlamps. The same reference numerals are given to the same elements of the right and left headlamps. A lamp body 101 and a transparent front surface cover 102 constitute a lamp housing 100, and a projector type lamp unit 110 is built in and supported by the lamp housing 100. The lamp unit 110 unitizes a reflector 111, which is formed of a rotary elliptical surface and has a shape close to a hemisphere, a light source 112 arranged inside the reflector 111, and a lens 113 attached to an opening in the front portion of the reflector 111. Also, a frame 120, which is movable in the forward and backward directions about a support shaft 121 as a fulcrum, is supported in the lamp housing 100, and the lamp unit 110 and the swivel ACTUs 6R and 6L are supported on the frame 120. The lamp unit 110 is rotatable in the horizontal direction by the swivel ACTUs 6R and 6L. The leveling ACTUs 5R and 5L are arranged on the outer rear surface of the lamp housing 100, and a driving rod (described further below) passes through the opening of a lamp body 101 and is hooked to the frame 120 to enable the frame to be inclined in the forward and backward directions. Accordingly, the lamp optical axis Lx of the lamp unit 110 is deflection-controlled in the right and left directions by the swivel ACTUs 5R and 5L, and deflection-controlled in the upward and downward directions by the leveling ACTUs 6R AND 6L.

Figure 3A:
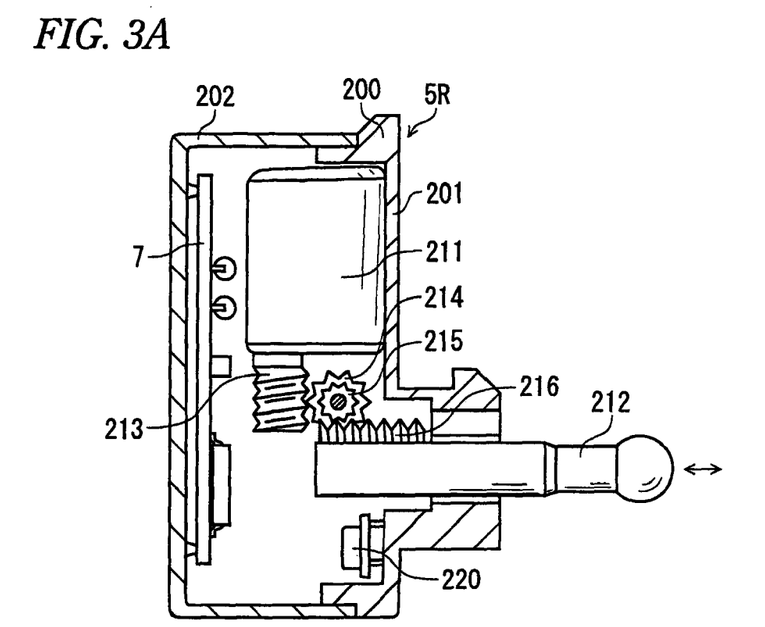
FIGS. 3A and 3B are views illustrating the structure of a leveling actuator unit.
Figure 3B:
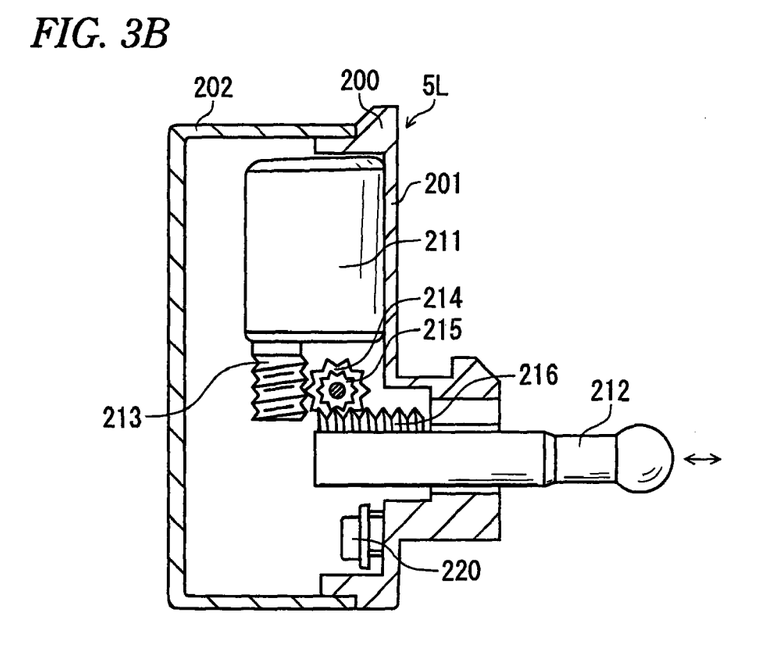

FIGS. 3A and 3B illustrate the right leveling ACTU 5R and the left leveling ACTU 5L, respectively. The same reference numerals are given to the same elements of the right and left leveling ACTUs. A casing 200 includes a base portion 201 shaped like a rectangular board, and a cover portion 202 shaped like a rectangular vessel that is attached to cover the base portion 201. In the present example, the base portion 201 is the main structural portion, and the cover portion 202 is the sub-structural portion. A leveling motor 211 is mounted on the base portion 201, and the leveling motor 211 includes an electric motor rotatably driven by a leveling control signal and a driving shaft 212 that expands and contracts through a straight reciprocating motion in the length direction by the rotating output of the leveling motor 211. The front end side of the driving shaft 212 projects in the vertical direction from the bottom surface of the base portion 201, and the front end portion 201a is flexibly connected to a part of the rear surface of the frame 120 as shown in FIG. 2. A worm 213 is fixed to the rotating output shaft of the leveling motor 211, and a worm wheel 214 engaged with the worm 213 is rotated. A pinion 215, which is axially supported on the same shaft as the worm wheel 214, is engaged with a rack 216 that is integrally installed with the driving shaft 212. Through the foregoing configuration, if the worm 213 is rotated in the forward and backward directions by the rotating force of the leveling motor 211, the worm wheel 214 and the pinion 215 are integrally rotated, the rack 216 moves by the rotation of the pinion 215, and thus the driving shaft 212 expands and contracts. With this expansion and contraction of the driving shaft 212, the frame 120 moves in the front and rear directions, and the lamp optical axis Lx of the lamp unit 110 is deflection-controlled in the upward and downward directions to perform the leveling control.

A motor driving unit 220 for driving the leveling motor 211 is constructed as a circuit board structural body, and is fixed to the base portion 201. Also, the leveling ECU 7 for controlling the rotation of the leveling motor 211 is constructed as a circuit board structural body, and is fixed along the inner surface of the cover portion 202 inside the casing 200. When the cover portion 202 is assembled with the base portion 201 to form the casing 200, the leveling ECU 7 is electrically connected to the motor driving unit 220. Further, although not illustrated in the drawing, a connector terminal is installed in the cover portion 202, and the leveling ECU 7 is connected to the common bus BUS and other interconnects through the connector terminal. The leveling ECU 7, as illustrated in FIG. 1, is provided with a leveling angle calculation unit 71 that calculates the leveling angle by performing a predetermined calculation based on the common vehicle height data, the common vehicle speed data, and the common lighting data output from the common bus BUS, and generates and provides the leveling control signal corresponding to the leveling angle to the motor driving unit 220.

In the illustrated example, the casings of the right and left leveling ACTUs 5R and 5L have the same configuration, and in particular, the base portions have the same configuration. However, one side of the cover portions 202 (e.g., the cover portion 202 of the right leveling ACTU 5R as shown in FIG. 3A) is provided with the leveling ECU 7, whereas the cover portion 202 of the left leveling ACTU 5L (as shown in FIG. 3B) is not provided with the leveling ECU. The left leveling ACTU 5L is connected to the right leveling ACTU 5R through a connector (not shown), and the output signal from the leveling ECU 7 of the right leveling ACTU 5R (i.e. the leveling control signal generated by the corresponding leveling ECU 7) is directly provided to the left leveling ACTU 5L to drive the leveling motor 211 of the left leveling ACTU 5L. That is, the leveling motors 211 in the right and left leveling ACTUs 5R and 5L are synchronized to be rotation-controlled, and cause the right and left lamp unit 110 to be synchronized with each other to perform the deflection control upward and downward (i.e. to perform the leveling control operation).

Accordingly, in the case of constructing the right and left leveling ACTUs 5R and 5L, base portions 201 having the same configuration are prepared, and one base portion, here, the base portion 201 of the right leveling ACTU 5R, is assembled with the cover portion 202 provided with the leveling ECU 7, whereas the base portion 201 of the left leveling ACTU 5L is assembled with the cover portion 202 that is not provided with the leveling ECU. By doing this, the right and left leveling ACTUs 5R and 5L are composed of the base portions 201 having the same configuration and the cover portions 202 covering the same, respectively. In this case, only the right cover portion 202 is assembled with the leveling ECU 7, and the cover portions 202 are assembled with the base portions 201, respectively, to provide the right and left leveling ACTUs 5R and 5L. Particularly, the casing 200 of the right and left leveling ACTUs 5R and 5L is common to both, and since the leveling ECU is provided in the one-side leveling ACTU 5L, the components of the whole system, particularly, the circuit components constituting the ECU, are in common. Thus, the number of corresponding circuit components is reduced so as to lower the cost of the system.

With respect to the swivel ACTUs 6R and 6L, the base portion and the cover portion constitute the casing in the same manner as the configuration of the leveling ACTUs 5R and 5L. The base portion may be provided with a swivel motor 211A for deflection-controlling the lamp unit 110 in the horizontal right and left directions, a motor driving unit 220A (see FIG. 1), and a gear mechanism. Also, the swivel ECU 8 generates and outputs a swivel control signal to the swivel motor by performing a predetermined calculation based on the common vehicle speed data Dv, the common steering angle date Dθ, and the common lighting data Ds provided to the common bus BUS. The swivel ECU 8 is also assembled on the circuit board, and in the case of a swivel control system that is synchronized with the right and left lamp units 110, the swivel ECU 8 is mounted on one cover portion (i.e., only the cover portion of the right swivel ACTU 6R), and the swivel ECU is not mounted on the cover portion of the left swivel ACTU 6L. Also, the swivel ECU 8 installed in the right swivel ACTU 6R provides the swivel control signal obtained through operation to the left swivel ACTU 6L. Accordingly, as with the leveling ACTU, the components are in common and thus the number of components is reduced so as to lower the cost of the system. At this time, in the case of the swivel control system that individually swivel-controls the right and left lamp units 110, the swivel ECU 8 is mounted on the right and left swivel ACTUs 6R and 6L, and the swivel control signal is calculated, generated and provided based on the common data output to the common bus BUS. However, even in this case, the common portion that performs the same operation in the left and right directions is installed on only one side of the right and left swivel ECUs 8, and the output of the common portion is provided to the other side of the swivel ECUs to simplify the configuration.

As described above, the vehicle height data, the vehicle speed data, the steering angle data, and the lighting data, which are obtained by operating the outputs of the vehicle height sensor Sh, the vehicle speed sensor Sv, the steering angle sensor Sθ, and the lighting switch sensor Ss through the ECUs 1, 2, 3 and 4, respectively, are provided to the common bus BUS as the common data Dh, Dv, Dθ and Ds in common based on the predetermined standard, and the control signals are obtained by operating the respective data output to the common bus BUS using the leveling ACTUs 5R and 5L and the swivel ACTUs 6R and 6L. Accordingly, as illustrated in FIG. 6, compared to the configuration in which the leveling ACTUs 5R and 5L and the swivel ACTUs 6R and 6L are independently provided with the leveling ECUs 7X and the swivel ECUs 8X, the circuit portions common to both the ECUs 7X and 8X can be in common, and thus the size of the whole system can be reduced.

Although the casings of the leveling ACTUs 5R and 5L and the swivel ACTUs 6R and 6L are called the base portion and the cover portion based on the shapes in the foregoing embodiments, the base portion may be in a vessel shape and the cover portion may be in a plate shape according to the shape of the casings. Even in this case, by integrally installing the ECU with the cover portion, in the same manner as the present embodiment, it is possible to apply the present invention thereto. That is, in the present embodiment, the main structural portion is composed at least of mechanical components such as a motor, an output portion, and gears installed in the base portion, and the sub-structural portion is composed at least of the cover portion that closes the base portion. Further, the front end of the shaft of the output portion that includes the mechanical components is not limited to a pivot shape, and may have a screw shape which slantingly operates the frame that is screw-engaged with the shaft when the shaft is rotated about the axis. Also, the gear structure is not limited to the configuration of the present embodiment.

Figure 4:
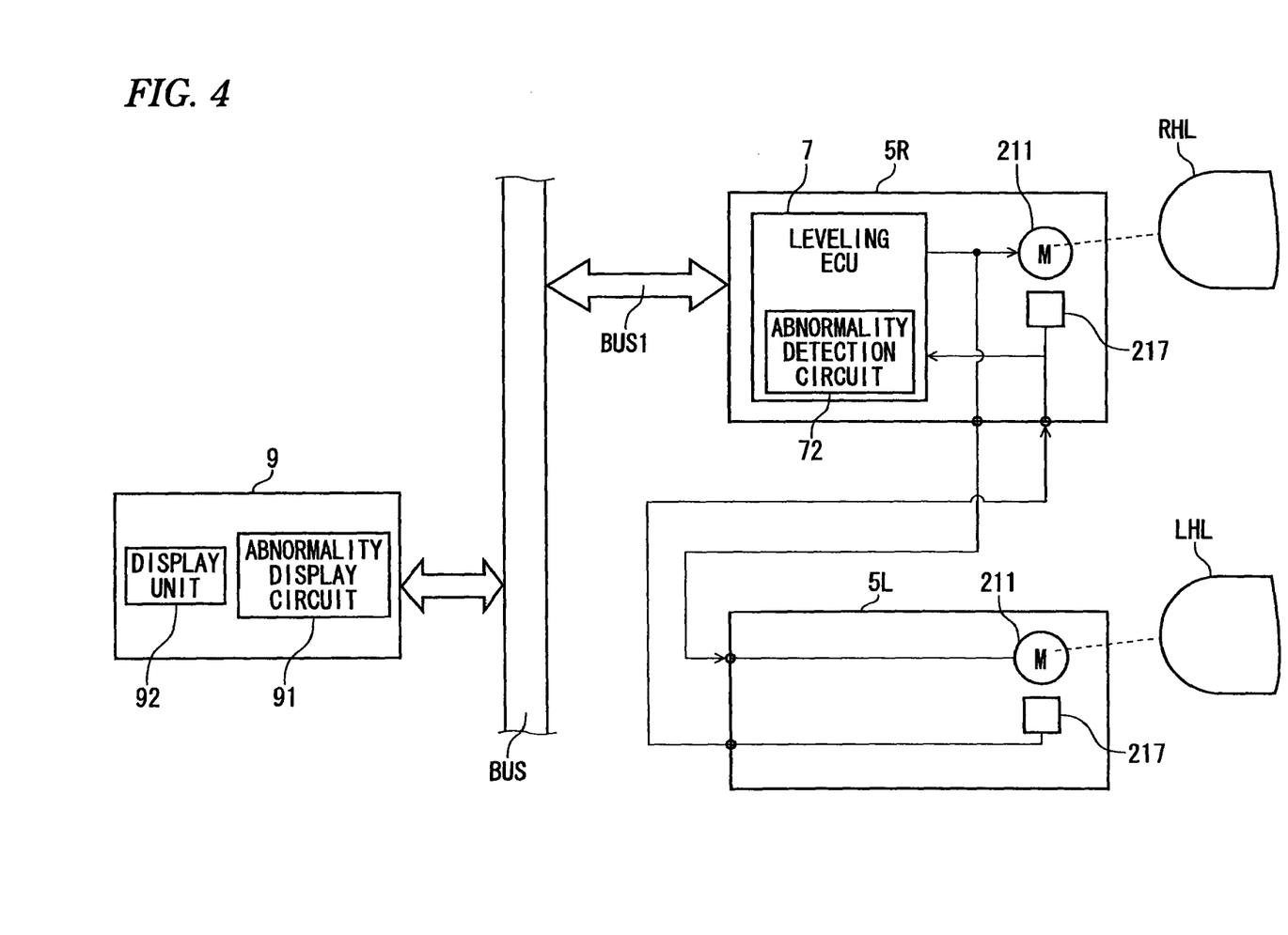
FIG. 4 is a block diagram illustrating the configuration of a part of the system in which the ECU is provided with an abnormality detection circuit according to an embodiment of the present invention.

As the respective leveling motors 211 of the left and right leveling ACTUs 5R and 5L are connected to the leveling ECU 7 installed in the right leveling ACTU 5R, as illustrated in FIG. 4, an abnormality detection circuit 72, which can detect a state where the leveling motor 211 is not rotated normally in response to the leveling control signal (i.e. a leveling control abnormality state is provided in the leveling ECU 7), and thus even if abnormality occurs in the leveling control of either of the right leveling ACTU 5R or the left leveling ACTU 5L, the abnormality detection circuit 72 can detect such an abnormality. In this case, the abnormality detection circuit 72 can be configured to detect which of the left or right leveling control is abnormal. Also, the leveling ECU 7 is configured to provide preset common abnormality data to the common bus BUS when the abnormality detection circuit 72 detects the abnormality.

For example, the abnormality detection circuit 72 detects the inconsistency between the leveling control signal and the rotating state of the leveling motor 211. For example, the abnormality detection circuit 72 compares a rotation instruction position of the leveling motor 211 indicated by the leveling control signal with the actual rotating position of the leveling motor 211, and if both the positions do not coincide with each other, it detects the abnormality. Detection of the rotating position of the leveling motor 211 is performed using a magnetic sensor 217 installed opposite a rotor of the leveling motor 211. The number of pulses of a pulse signal from the magnetic sensor 217 is measured in accordance with rotation of the leveling motor 211. When the abnormality is detected, the signal level of a connection bus BUS1 that connects the leveling ACTU and the common bus BUS is automatically set to a predetermined abnormal voltage level (for example, GND level). This abnormal voltage level is considered as an inherent voltage level when the leveling control becomes abnormal and, for example, is set to be different from a voltage level when the swivel control becomes abnormal. Accordingly, it is possible to provide the corresponding signal of the abnormal voltage level as common abnormality data for the leveling control with respect to the common bus BUS.

Also, as illustrated in FIG. 4, for example, an abnormality display 9 can be arranged on a vehicle dashboard. An abnormality display circuit 91 for performing the abnormality display by processing the common abnormality data provided to the common bus BUS can be provided in the abnormality display 9. In this case, the abnormality display 9 performs the abnormality display based on the common abnormality data transferred from the leveling ECU 7 to the common bus, and the abnormality display 9 displays the abnormality of the leveling control on a display unit 92 to allow the crew to recognize the presence of the abnormality. For example, the abnormality display circuit 91 detects the voltage level of the signal output to the common bus BUS and, if it is determined that the detected voltage level is the leveling control abnormality voltage level (i.e., GND level in this case), it displays the abnormality of the leveling control. In this case, it is possible to display the abnormality of the leveling control in either of the left or right leveling ACTUs. It is also possible to display the abnormality of the swivel control in the same manner. In this case, by setting the common abnormality data provided to the common bus BUS to a voltage level that is different from the voltage level when the leveling control is in an abnormal state, it is possible for the abnormality display 9 to determine the abnormal swivel ACTU accurately. Accordingly, in the case where the control system of FIG. 1 is configured to detect the abnormality of the respective control, it is not necessary to arrange the ECU provided with the abnormality detection circuit and the abnormality display processing circuit in the left and right leveling ACTUs 5R and 5L. Nor is it necessary to provide an independent dedicated connection line for detecting the abnormality. Thus, the size of the system configuration can be further reduced.

If the GND level is set as the predetermined voltage level when the abnormality is determined in the abnormality display circuit 91 as described above, the abnormality can be detected even if the interconnect that connects the common bus BUS and the leveling ECU 7 is short-circuited to ground. Also, if the electric potential of the power, or both the GND level and the electric potential of the power, is set at a predetermined voltage level, the abnormality can be detected even if the interconnect is short-circuited to the power. Thus, reliability for the abnormality display can be enhanced.

As shown in FIG. 4, the abnormality detection circuit 72 is installed in the leveling ECU 7. However, in some implementations, the abnormality detection circuit 72 is replaced by a feedback control circuit. In that case, the feedback control circuit compares the rotation instruction position of the leveling motor 211 indicated by the leveling control signal with the actual rotating position of the leveling motor 211. If the positions do not coincide with each other, the feedback circuit operates according to the difference between the positions and controls the rotation of the leveling motor 211 so that the difference becomes "0" (i.e., so that the positions coincide with each other). Accordingly, it is possible to control the lamp optical axis Lx to a predetermined leveling angle position indicated by the leveling control signal. Even in this case, since the left leveling ACTU 5L can be controlled by the leveling ECU 7 installed in the right leveling ACTU 5R, it is not necessary to install a separate leveling ECU in the left leveling ACTU 5L. Thus, it is possible to reduce the size of the whole system.

Figure 5A:
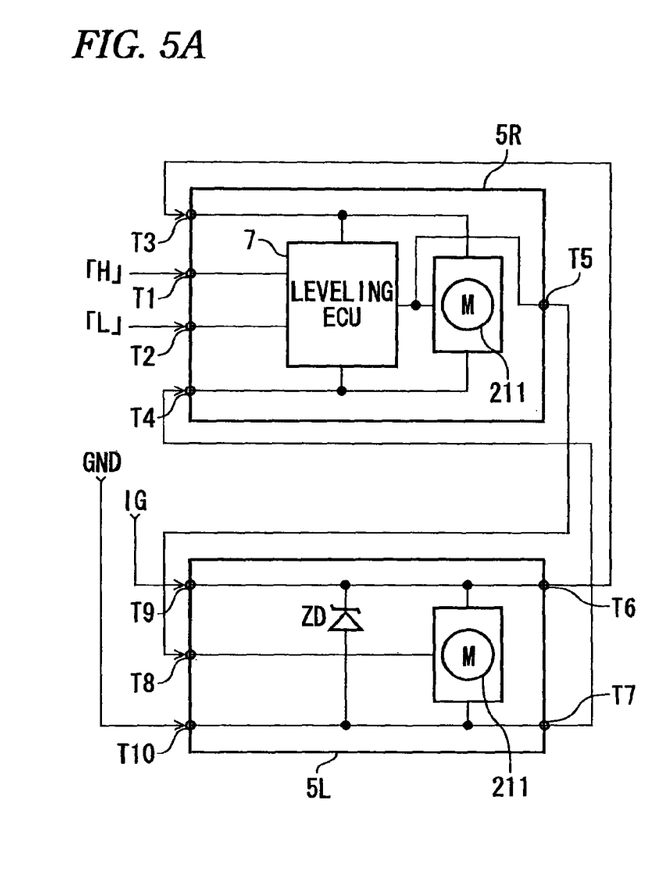
FIGS. 5A and 5B are diagrams illustrating the number of terminals in ECU.
Figure 5B:
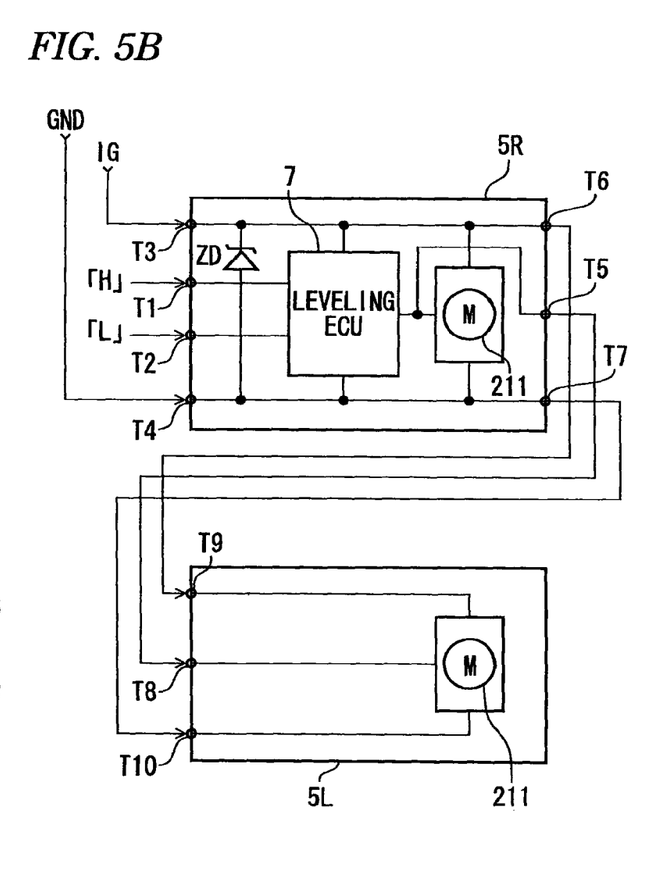

As illustrated in FIG. 5B, the ACTU provided with the leveling ECU 7 (e.g., the right leveling ACTU 5R of FIG. 1 (hereinafter referred to as "equipment ACTU")) requires a control signal output terminal T5 for providing a control signal to the ACTU that is not provided with the ECU (e.g., the left leveling ACTU 5L (hereinafter referred to as "non-equipment ACTU")). This is in addition to an H signal terminal T1 and an L signal terminal T2 (which are connected to the common bus BUS to provide a H-level signal and a L-level signal, respectively), a power supply terminal T3, and a GND terminal T4. Also installed in the equipment ACTU 5R are the following components: a Zener diode ZD for positive surge voltage compensation of the inner circuit of the leveling ECU 7, an auxiliary power supply terminal T6 for connecting the surge-compensated power to a power supply terminal T7 of the non-equipment ACTU 5L to perform the positive surge compensation in the leveling motor, and an auxiliary GND terminal T7 for connecting to the GND. On the other hand, the following components are installed in the non-equipment ACTU 5L: a control signal input terminal T8, a power supply terminal T9, and a GND terminal T10. As a result, a larger number of terminals is required in the equipment ACTU 5R than the number of terminals in the non-equipment ACTU 5L. Thus, the equipment ACTU and the non-equipment ACTU use connectors having different standards (i.e., terminal numbers). For example, the equipment ACTU 5R may use a connector having seven terminals and the non-equipment ACTU 5L may use a connector having three terminals. In such a case, if connectors having the same standard are used, the non-equipment ACTU 5L leaves four terminals idle.

As illustrated in FIG. 5A, the Zener diode ZD for the positive surge voltage compensation is connected to the non-equipment ACTU 5L with an input of the power IG and the GND thereto. The positive surge compensated power from the Zener diode ZD is supplied to the non-equipment ACTU 5L. Accordingly, instead of newly installing the auxiliary power supply terminal in the non-equipment ACTU 5L, the auxiliary power supply terminal is unnecessary in the equipment ACTU 5R. As a result, the terminal numbers in the connector in the equipment ACTU 5R and the non-equipment ACTU 5L are the same (i.e., five). Although in the illustrated example of FIG. 5A, the Zener diode ZD is connected to the power input line of the left leveling ACTU 5L, the Zener diode is not connected to the power input line of the leveling ECU 7 of the right leveling ACTU 5R, and the left leveling ACTU 5L provides the positive surge compensated power supply voltage from the auxiliary power terminal T6 to the leveling ECU 7 of the right leveling ACTU 5R. Accordingly, there are five terminals in the right leveling ACTU 5R including the H signal terminal T1, the L signal terminal T2, the power supply terminal T3, the GND terminal T4, and the auxiliary power supply terminal T5. Likewise, there are five terminals in the left leveling ACTU 5L including the control signal input terminal T8, the power supply terminal T9, the GDN terminal T10, the auxiliary power supply terminal T6, and the auxiliary GND terminal T7. Accordingly, the left and right leveling ACTUs can be configured using connectors having the same standard. Thus, the use of common connectors and sub-structural bodies can be realized so as to further reduce the number of components.

In the foregoing embodiments, a control system provided with the leveling ACTU and the swivel ACTU has been described. However, even in a control system provided with ACTUs for controlling the optical irradiation characteristics of headlamps and other auxiliary lamps, the overall size of the system can be reduced using common data output to the common bus. It is also possible to use the common data output to the common bus even in ACTUs other than the optical irradiation control. Further, it is also possible to use the common data as information when a control means other than the ACTUs performs the control.

The present invention can be applied to a control system that includes an actuator for controlling the optical irradiation characteristics such as the direction of the lamp optical axis of the vehicle lamp and the optical irradiation direction and controls the actuator based on a sensor output signal for detecting the vehicle state.

Although the present invention has been described with reference to certain example implementations, it will be understood by those of ordinary skill in the art that various changes may be made without departing from the spirit and scope of the invention as defined by the claims. Accordingly, other implementations are within the scope of the claims.

What is claimed is:

1. A light irradiation control system for a vehicle lamp, the light irradiation control system comprising:
   a control unit configured to provide control signals for controlling light irradiation of the vehicle lamp based on detection signals generated by a plurality of sensors; and
   a plurality of actuator units configured to control the light irradiation of the vehicle lamp based on the control signals,
   wherein the control unit comprises:
      a body-side control unit comprising a plurality of electronic control units each of which is configured to perform signal processing on the detection signals and to provide the signal-processed signals to a common bus as common data; and
      one or more lamp-side control units coupled to the common bus and coupled to a common connector, wherein the one or more lamp-side control units provide the control signals to the common connector based on the common data provided to the common bus, wherein the one or more lamp-side control units are mounted in at least one, but fewer than all, of the actuator units;

wherein each of the actuator units further includes a motor driving unit coupled to the common connector, and wherein the motor driving unit in at least one of the actuator units, in which the one or more lamp-side control units are not mounted, drives the light irradiation of the vehicle lamp based on control signals from the one or more lamp-side control units.

2. The light irradiation control system according to claim 1, wherein each of the actuator units comprises:

a main structural portion configured according to a standard; and a sub structural portion having the same standard as the main structural portion, and wherein each of the lamp-side control units is mounted on the sub-structural unit.

3. The light irradiation control system according to claim 1, wherein each of the one or more lamp-side control units comprises an abnormality detection unit configured to detect abnormalities of the actuator units to provide abnormality detection signals, and wherein each of the lamp-side control units is configured to provide the abnormality detection signals to the common bus as data.

4. The light irradiation control system according to claim 3, wherein each of the one or more lamp-side control units comprises an operational position detection unit configured to detect operational positions of the actuator units to provide operational position detection signals, and wherein each of the lamp-side control units is configured to provide the operational position detection signals to the common bus as data.

5. The light irradiation control system according to claim 1, wherein the actuator units are configured to control an optical axis direction of the vehicle lamp.

6. The light irradiation control system according to claim 1, wherein the plurality of sensors includes a vehicle height sensor, a vehicle speed sensor, a steering angle sensor and a lighting switch sensor, and wherein the plurality of electronic control units includes a first electronic control unit configured to perform signal processing on detection signals from the vehicle height sensor, a second electronic control unit configured to perform signal processing on detection signals from the vehicle speed sensor, a third electronic control unit configured to perform signal processing on detection signals from the steering angle sensor, and a fourth electronic control unit configured to perform signal processing on detection signals from the lighting switch sensor.

7. The light irradiation control system according to claim 1, wherein the plurality of sensors comprises a vehicle height sensor.

8. The light irradiation control system account to claim 1, wherein the plurality of sensors comprises a vehicle speed sensor.

9. The light irradiation control system account to claim 1, wherein the plurality of sensors comprises a steering angle sensor.

10. The light irradiation control system account to claim 1, wherein the plurality of sensors comprises a lighting switch sensor.

11. The light irradiation control system according to claim 3, wherein the lamp-side control unit is configured to provide the abnormality detection signal in response to detecting an abnormality.

12. The light irradiation control system according to claim 11, wherein the detection signal comprises an electric signal having a voltage level that corresponds to the actuator unit.

13. The light irradiation control system according to claim 3, wherein the abnormality detection unit is configured to detect abnormalities by detecting an inconsistency between the control signals and a state of the motor driving unit.

14. The light irradiation control system according to claim 3, further comprising an abnormality display unit coupled to the common bus, wherein the abnormality display unit is configured to process abnormality detection signals provided to the common bus, and display information corresponding to the detected abnormality.

\* \* \* \* \*